(12) United States Patent
Frankel et al.

(10) Patent No.: US 7,310,318 B1
(45) Date of Patent: Dec. 18, 2007

(54) METHOD AND SYSTEM FOR USING OPTICAL PHASE CONJUGATION IN AN OPTICAL COMMUNICATIONS NETWORK

(75) Inventors: Michael Y. Frankel, Baltimore, MD (US); Harshad P. Sardesai, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 927 days.

(21) Appl. No.: 10/139,270

(22) Filed: May 3, 2002

(51) Int. Cl.
*H04J 1/16* (2006.01)
(52) U.S. Cl. .................. 370/252; 370/430; 370/480; 398/81; 398/150
(58) Field of Classification Search ............... 370/252, 370/430, 486–490, 535, 516, 517, 519, 386, 370/468, 480; 398/147, 150, 79, 42, 43, 398/9, 48, 68, 81; 725/149; 385/27
See application file for complete search history.

(56) References Cited

U.S. PATENT DOCUMENTS

| | | | |
|---|---|---|---|
| 5,365,362 A * | 11/1994 | Gnauck et al. ............. 398/150 |
| 5,963,361 A | 10/1999 | Taylor et al. ................ 359/337 |
| 5,978,115 A | 11/1999 | Condict et al. ............... 398/79 |
| 6,049,413 A | 4/2000 | Taylor et al. ................ 359/337 |
| 6,057,959 A | 5/2000 | Taylor et al. .......... 359/337.13 |
| 6,061,171 A | 5/2000 | Taylor et al. ............. 359/337.1 |
| 6,128,118 A * | 10/2000 | Marcenac ................... 398/147 |
| 6,175,435 B1 | 1/2001 | Watanabe ................... 398/150 |
| 6,259,845 B1 | 7/2001 | Sardesai ..................... 385/123 |
| 6,392,769 B1 * | 5/2002 | Ford et al. ...................... 398/9 |
| 2003/0039006 A1* | 2/2003 | Carbone et al. ............ 359/124 |
| 2003/0118347 A1* | 6/2003 | Papaparaskeva et al. ... 398/147 |
| 2005/0220399 A1* | 10/2005 | Alberti et al. ................ 385/27 |

FOREIGN PATENT DOCUMENTS

EP 1133031 12/2001

OTHER PUBLICATIONS

A. J. Lucero, et al., "Impact of bit pattern and dispersion variation on cross-phase modulation penalty," Optical Fiber Communications Conference Technical Digest, 1999, vol. 3, pp. 37-38.

L. E. Nelson, et al., "Resonances in cross-phase modulation impairment in wavelength-division-multiplex lightwave transmission," IEEE Photonics Technology Letters, vol. 11, No. 7, Jul. 1999, pp. 907-909.

(Continued)

*Primary Examiner*—John Pezzlo
(74) *Attorney, Agent, or Firm*—Clements Walker; Christopher L. Bernard; Tyler S. Brown

(57) ABSTRACT

A optical communications network including at least one optical phase conjugator for compensating for non-linear effects. The optical communications network includes at least one dispersion compensation module before the optical phase conjugator and at least one dispersion compensation module after the optical phase conjugator. The dispersion compensation modules compensate for linear effects of the transmission path such as dispersion and dispersion slope. This allows the optical phase conjugator to be designed to compensate for non-linear effects such as self-phase modulation and cross-phase modulation. The separate compensation of linear and non-linear effects provides enhanced control of these effects.

18 Claims, 4 Drawing Sheets

OTHER PUBLICATIONS

S. G. Evangelides, Jr., "Cross phase modulation resonances in WDM systems," Optical Fiber Communications Conference Technical Digest, 1999, vol. 3, pp. 240-242.

Giovanni Bellotti, et al., "10x 10 Gb/s cross-phase modulation suppressor for multispan transmissions using WDM narrow-band fiber Bragg gratings," IEEE Photonics Technology Letters, vol. 12, Oct. 2000, pp. 1403-1405.

Amnon Yariv, et al., "Compensation for channel dispersion by nonlinear optical phase conjugation," Optical Society of America, 1978.

Chaloemphon Lorattanasane, et al., "Design theory of long distance optical transmission systems using midway optical phase conjugation, " Journal of Lightwave Technology, vol. 15, Jun. 1997, pp. 948-955.

Thomas Merker, et al., "High bit rate OTDM transmission over standard fiber using mid-span spectral inversion and its applications," IEEE Journal of Selected Optics in Quantum Electronics, vol. 6, No. 2, Mar./Apr. 2000, pp. 258-262.

Pasu Kaewplung, et al., "Feasibility of 100-gb/s 10000-km single-channel optical transmission by midway optical phase conjugation incorporated with third-order dispersion compensation," IEEE Photonics Technology Letters, vol. 13, No. 4, Apr. 2001, pp. 293-295.

P. Y. Cortes, et al., "Numerical simulation of 10-Gbit/s transmission over 9000 km with 50-km amplifier spacing using optical phase conjugation in the terminal unit," 1997 Optical Fiber Comm Conference Technical Digest, pp. 201-202.

M.-H. Chou, et al., "Optical frequency mixers for WDM and TDM applications," 2000 Optical Fiber Comm Conference Technical Digest, paper FB1-1-FB1-4.

Alexandra G. Gandpierre, et al., "Theory of stimulated Raman scattering cancellation in wavelength-division-multiplexed systems via spectral inversion," IEEE Phot. Techn. Lett., vol. 11, pp. 1271-1273, Oct. 1999.

* cited by examiner

METHOD AND SYSTEM FOR USING OPTICAL PHASE CONJUGATION IN AN OPTICAL COMMUNICATIONS NETWORK

BACKGROUND OF THE INVENTION

1. Field of Invention

This invention relates to a method and system for using optical phase conjugation in an optical communications network.

2. Description of Related Art

Fiber-optic communication networks are experiencing rapidly increasing deployment. Especially rapid is the growth of segments that carry multi-gigabit digital data on multiple wavelengths over a single fiber strand, which are known as wavelength division multiplexing (WDM). The wavelength channel density (i.e., the number of channels carried by one fiber) and the data rate carried on individual wavelengths continue to increase. Current systems employ 50 GHz channel spacing, but 25 GHz and 12.5 GHz channel spacings are expected to be utilized. Data rates of 10 Gbps are currently used, but 40 Gbps data rates are also expected. Both increased channel density and increased data rate contribute to increased crosstalk between channels.

Several linear and non-linear effects contribute to the deterioration of the signal and crosstalk. One linear effect that limits transmission length is chromatic dispersion, which causes signal bits to spread due the wavelength dependence of the index of refraction of the transmission fiber. Since a bit contains many wavelengths traveling at different speeds, the bit tends to distort as it travels along the transmission fiber resulting in inter-symbol interference and bit errors.

Non-linear effects also induce crosstalk and deteriorate signal quality. For passive optical fibers, the crosstalk mechanisms include cross-phase modulation, four-wave mixing, and Raman crosstalk. Further, active components such as fiber-based or semiconductor based optical amplifiers will add cross-gain modulation. These nonlinear crosstalk effects, arising due to the fiber Kerr non-linearity and due to the Raman effect, are additive to the overall interference level. The additive effect occurs in terms of each additional wavelength channel contributing a crosstalk component to the overall interference level. The additive effect also occurs in systems that have multiple optical spans with intermediate optical amplification, such that each span additively contributes a crosstalk component to the overall noise level. Accordingly, the additive non-linear effects can significantly impact performance of WDM transmission systems, particularly those over long distances, having multiple spans, each including amplifiers.

The non-linear effects described above, specifically self-phase-modulation and cross-phase-modulation are coupled to dispersion compensation. Specifically, the non-linear phase imparted to an information bearing channel from its own intensity modulation (i.e. self-phase-modulation or SPM) or due to the intensity modulation of its neighbors (cross-phase-modulation or XPM) gets converted to intensity noise through dispersion. For example, the amount of intensity noise generated due to SPM and XPM at a direct detection receiver (which is insensitive to optical phase noise), depends not only on the amount of phase noise generated through the non-linear process, but also the extent to which this phase noise gets converted to intensity noise from uncompensated dispersion.

A simple and conventional way of mitigating the conversion to intensity noise would be to perfectly compensate the dispersion experienced by the channel. In a multi-span, multi-channel WDM system, this amounts to bringing the residual dispersion to zero at the end of each span for all channels.

While this technique of compensating dispersion does negate XPM and SPM effects in amplitude-modulated channels, it can cause resonance effects since all signals are compressed back to their start positions and are also all aligned in time (i.e., there is no time skew between signals). To avoid resonance effects, the dispersion at the end of each span is not allowed to be zero, but is kept at some small positive or negative value. Further, phase-modulated channels that use phase-sensitive receivers may require a different optimization of dispersion along the fiber link.

A second complication of this solution that arises in multi-channel systems is the inability to perfectly match the dispersion slopes of the transmission fiber and dispersion compensating fiber. This results in different channels experiencing different levels of residual dispersion at the end of each span.

A third problem with mitigating XPM and SPM effects with perfect per-span dispersion compensation is the distributed nature of SPM and XPM generation. The non-linear phase shift from SPM and XPM is generated most strongly in the sections of the fiber where the optical power is highest and amplitude variations are most rapid. For amplitude-modulated channels, this section is typically in the first few kilometers of the transmission fiber following an optical amplifier. After the first few kilometers, the signals diverge (e.g., walk-off) away from each other which reduces XPM and/or reduce in intensity due to the fiber attenuation which reduces both XPM and SPM. Since the non-linear phase shift is generated over several kilometers, the compensation has to also occur over a similar distance.

A fourth problem with mitigating SPM and XPM effects are non-overlapping dispersion optimization points for SPM compensation and XPM compensation. In some situations, small amounts of SPM are used to actually enhance system performance. For all these reasons, as transmission distances increase, it becomes more difficult to mitigate XPM and SPM generated noise by simple dispersion compensation or dispersion mapping.

Existing solutions to counteract linear effects and non-linear effects and extend system reach include optimal dispersion mapping, use of slope compensating DCF fibers, use of Raman amplification, use of Forward Error Correction (FEC), and use of dynamic gain equalizers to flatten the spectrum. Each solution on its own and in conjunction with others can extend the reach of WDM systems. However, all solutions to counteract linear effects and non-linear effects either reduce the launch power required to maintain a required signal to noise ratio for detection (Raman amplification and FEC), or make the non-linear effects more symmetric across channels so some channels are not overly penalized (Dynamic Gain Equalizers), or reduce the conversion of non-linear phase noise to intensity noise (slope compensating DCFs and dispersion mapping).

Even after incorporating all the above solutions, substantial amounts of non-linear effects are still present in WDM systems, especially for systems having closely spaced channels, long transmission distance and/or higher data rates. None of the known techniques offers a solution that neutralizes non-linear effects that are present after all of the commonly used solutions are used.

Optical Phase Conjugators (OPCs) provide a means for compensating for the non-linear effects. Optical phase conjugation works on the principle of spectrum inversion.

Basically, as an optical signal travels through an optical fiber it experiences optical phase shifts introduced both by itself and by adjacent optical channels. In the spectral domain, these non-linear effects change the frequency content of the signal. Such phase shifts and frequency components are added with signs determined by the intensity edge slope. If such a signal passes through a device (i.e., a phase conjugator) where its optical spectrum is inverted, (that is made into a mirror image of the input), then propagation through the remaining portion of the optical fiber tends to unravel the non-linear effects impressed on the signal prior to passing through the phase conjugator. If the first and second portion of the optical fiber (the first portion being before the conjugator and the second portion after the conjugator) are roughly equal in length, dispersion and optical power, complete cancellation of the non-linear effects can be achieved in theory.

Optical phase conjugation can also be used to cancel dispersive effects in optical fiber. Early applications of optical phase conjugators were for compensating linear dispersion. The early work considered only the linear dispersive signal distortion, which could be compensated by positioning the OPC in the center of the span. Subsequent applications included compensating intra-channel distortion, such as SPM, induced by Kerr effect in the fiber, by positioning the OPC in the center of the span. Such simultaneous compensation of chromatic dispersion and non-linear effects (e.g., SPM) places simultaneous constraints on the approximate equality of both transmission fiber dispersion and accumulated nonlinear phase shift on the opposite sides of the span.

BRIEF DESCRIPTION OF THE DRAWINGS

Embodiments of the invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical device are imparted to the "communicating" device. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
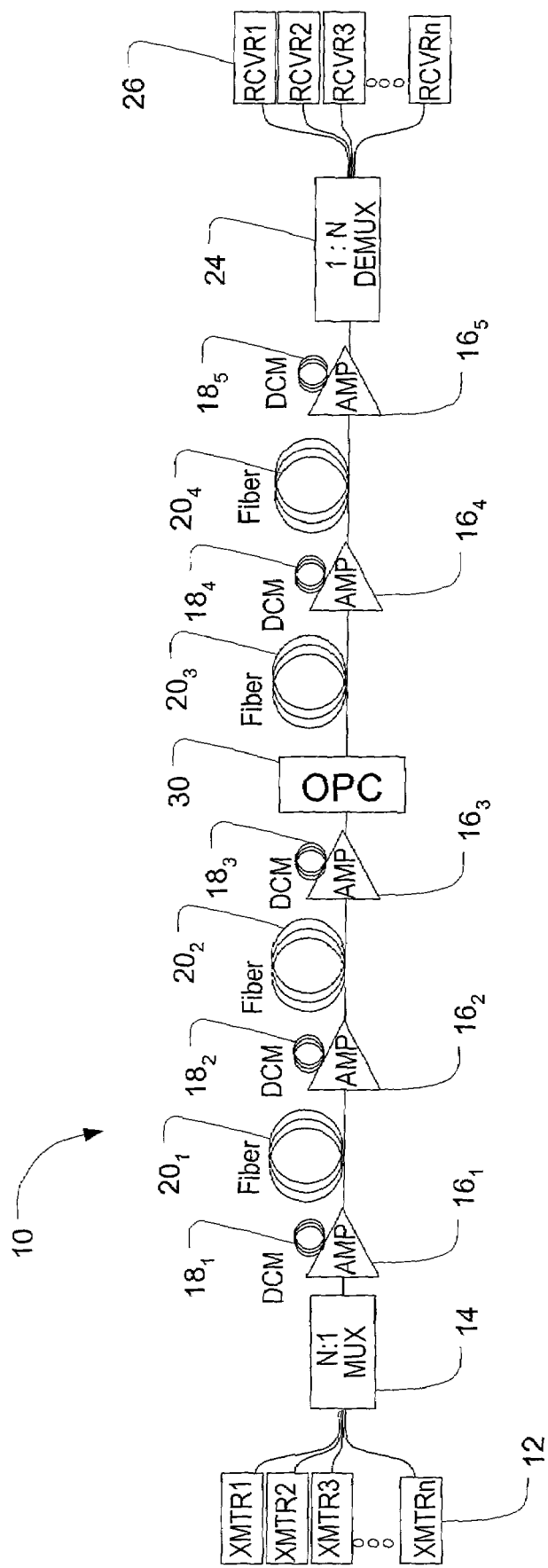
FIG. 1 is a block diagram of an exemplary optical communications network in an embodiment of the invention.

FIG. 1 depicts an optical communications network 10 in an exemplary embodiment of the invention. The network 10 includes a number of transmitters 12, each generating a transmit signal on a distinct optical wavelength for transmission over the network. The transmitters (XMTR$_1$-XMTR$_N$) 12 optically communicate with an optical multiplexer 14 that combines the individual transmit signals into a multiplexed signal. It is understood that a multilevel multiplexing may occur and a single multiplexer is depicted for convenience. The multiplexed signal is optically communicated to an amplifier 16 which may be any known type of amplifier including an optically active material (e.g., erbium) such as an erbium-doped fiber amplifiers (EDFA), an erbium-doped waveguide amplifiers (EDWA) or semiconductor optical amplifiers (SOA). Optical amplification can also be accomplished in a distributed manner by utilizing Raman amplification.

Also depicted at each amplifier 16 is a dispersion compensation module (DCM) 18. It is understood that the DCM 18 need not be positioned at the amplifier site and may be positioned at any location along the transmission path. Alternatively, the DCM 18 may be included as a component within an amplifier 16 or the DCM 18 may be implemented as part of fiber link 20 (e.g., a length of dispersion compensating fiber in the link). The path from transmitters to receivers (e.g., terminal-to-terminal) is referred to as a span. A section of fiber joining two components is referred to as a link. The optical communications network may include a number of spans. The system of FIG. 1 provides periodic amplification and periodic dispersion compensation over fiber links 20 both before and after OPC 30.

The DCM 18 provides compensation for chromatic dispersion and may include a length of dispersion compensating fiber having a dispersion coefficient and length suitable to substantially counteract dispersion in the preceding fiber link. In addition, the DCM's 18 positioned after the OPC 30 may substantially compensate for chromatic dispersion and/or dispersion slope introduced by the OPC 30. Alternatively, the DCM's 18 may provide distributed dispersion compensation. In other words, the DCM's 18 are spread out across multiple links to compensate for dispersion and dispersion slope values in an "averaged" sense across multiple fiber links.

Dispersion compensation can be accomplished using conventional techniques. Some examples may include, dispersion compensating fiber, dispersion compensating fiber Bragg gratings, dispersion compensating thin film filters, etc.

In addition, the DCM 18 may control dispersion slope such that the amount of accumulated dispersion is substantially uniform across multiple channels. It is preferable to not compensate for dispersion exactly, as such compensation may lead to adverse resonant effects. Techniques for controlling dispersion and dispersion slope are disclosed in co-pending U.S. patent application Ser. Nos. 09/844,830 and 09/844,826 filed Apr. 27, 2001 and commonly-owned by the assignee of this application.

In an alternate embodiment, the dispersion compensation and/or dispersion slope compensation may be provided by including dispersion compensating fiber as part of the fiber link 20. Thus, the DCM 18 is not limited to components or devices separate from the fiber link 20, but may be implemented as part of the fiber link 20.

The DCM 18 optically communicates with the fiber link 20. In an exemplary embodiment, the fiber link 20 is non-dispersion shifted fiber (NDSF) but may be implemented using other types of fiber such as dispersion-shifted fiber (DSF). The fiber link 20 optically communicates with further amplifiers 16n, DCM's 18n and fiber links 20n that make up the transmission path. A demultiplexer 24 in optical communication with the final amplifier $16_5$ demultiplexes a conjugate signal to derive a number of receive signals, each on a different carrier wavelength. A multi-level demultiplexer may be used and a single demultiplexer is depicted for convenience. Each receive signal is directed to an appropriate receiver ($RCVR_1$-$RCVR_N$) 26 designated for a particular wavelength.

Also located in the transmission path is an optical phase conjugator 30. In the embodiment shown in FIG. 1, the OPC 30 is disposed between transmitters 12 and receivers 26 so that non-linear effects experienced prior to the OPC 30 are compensated for by the transmission path after the OPC. If the transmission path experiences substantially constant non-linear effects per unit length, the OPC 30 may be placed approximately at the physical center of the transmission path. Of course, if the transmission path has varying non-linear effects, then the OPC 30 is positioned so that the accumulated non-linear effects prior to the OPC 30 are canceled by non-linear effects after the OPC 30.

The OPC 30 may be implemented using known techniques. For example, four-wave mixing in a highly nonlinear fiber can be used to generate the optically-conjugated wave. Another example may be the use of four-wave mixing in a semiconductor optical amplifier. Another example may be the use of three-wave mixing in an electro-optic waveguide, as could be made with a $LiNbO_3$ material. Such devices typically employ a pumping light source for outputting a pumping light and a non-linear optical material for receiving signal light and the pumping light. An optical filter may be used to separate the phase conjugate light from non-phase conjugate light as desired.

Figure 2:
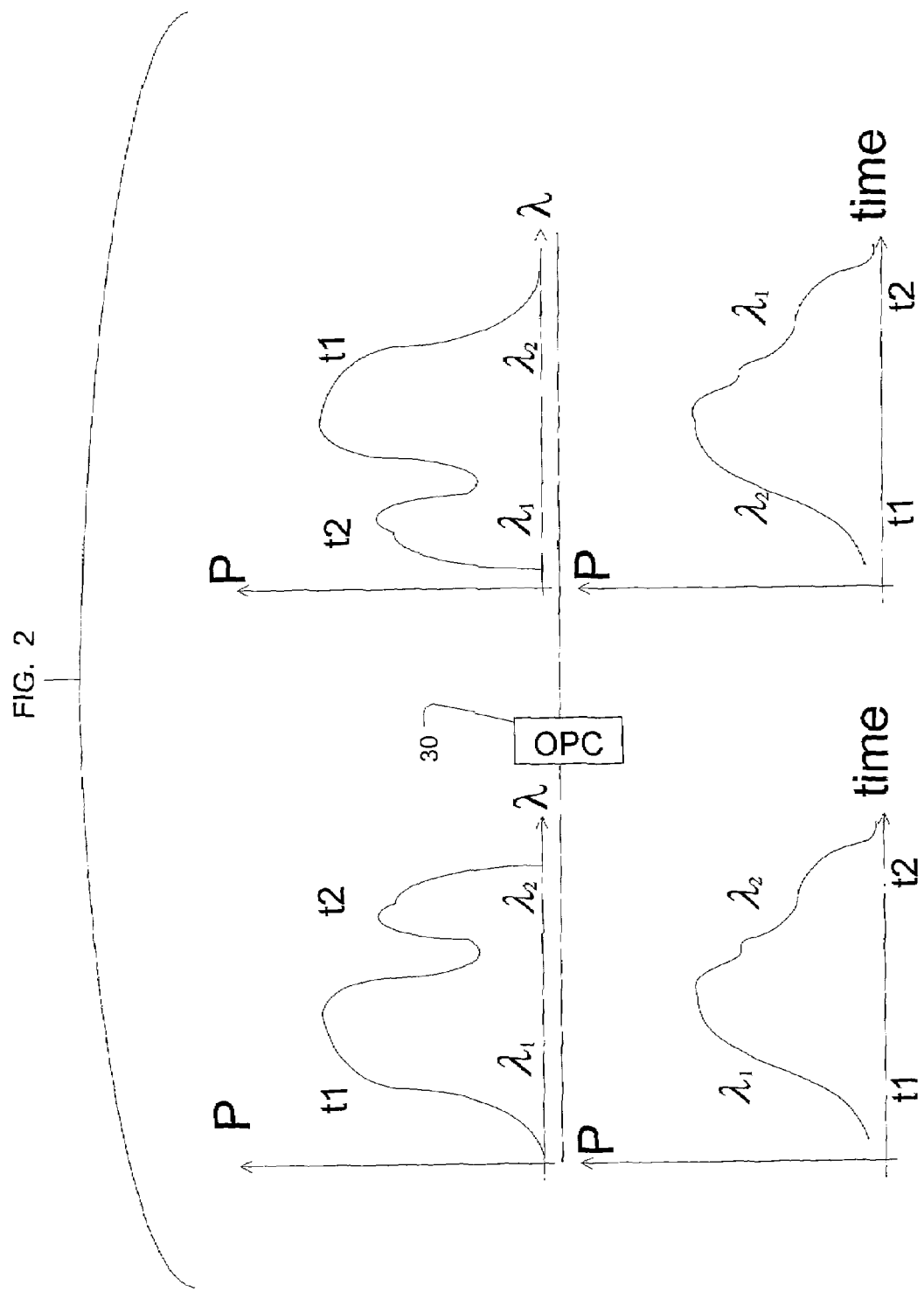
FIG. 2 illustrates the effect of optical phase conjugation on an optical signal.

The OPC 30 receives the incoming multiplexed signal and produces a conjugate signal with a spectrally inverted, shifted, and phase-conjugated characteristics. FIG. 2 depicts optical power versus wavelength and optical power versus time both before and after the OPC 30. As shown in FIG. 2, the OPC 30 repositions wavelengths in a pulse so that leading edge wavelengths 82 are placed at the trailing edge of the conjugated pulse and trailing edge wavelengths 81 are placed at the leading edge of the conjugated pulse.

This conjugate signal is again propagated though a series of fiber links 20, with periodic amplification at amplifiers 16 and dispersion compensation at DCM's 18. The non-linear effects that are added after the OPC 30 by the fiber links act to cancel a portion of the non-linear effects accumulated before the OPC 30. Thus, as the signal propagates, the non-linear effects are gradually mitigated resulting in a performance improvement relative to a similar system without OPC 30. The non-linear effects are mitigated up to the point where the nonlinear effects accumulated in front of the OPC are largely cancelled by the propagation after the OPC. Beyond this distance, the non-linear effects start to grow again.

In the system of FIG. 1, the dispersion compensation modules 18 are separate components from the OPC 30. Thus, the compensation of dispersion (and optionally dispersion slope) is decoupled from the compensation of non-linear effects. This eliminates the trade-offs often encountered when attempting to correct both dispersion and non-linear effects with a common device. Accordingly, more accurate compensation of dispersion and non-linear effects may be achieved.

Figure 3:
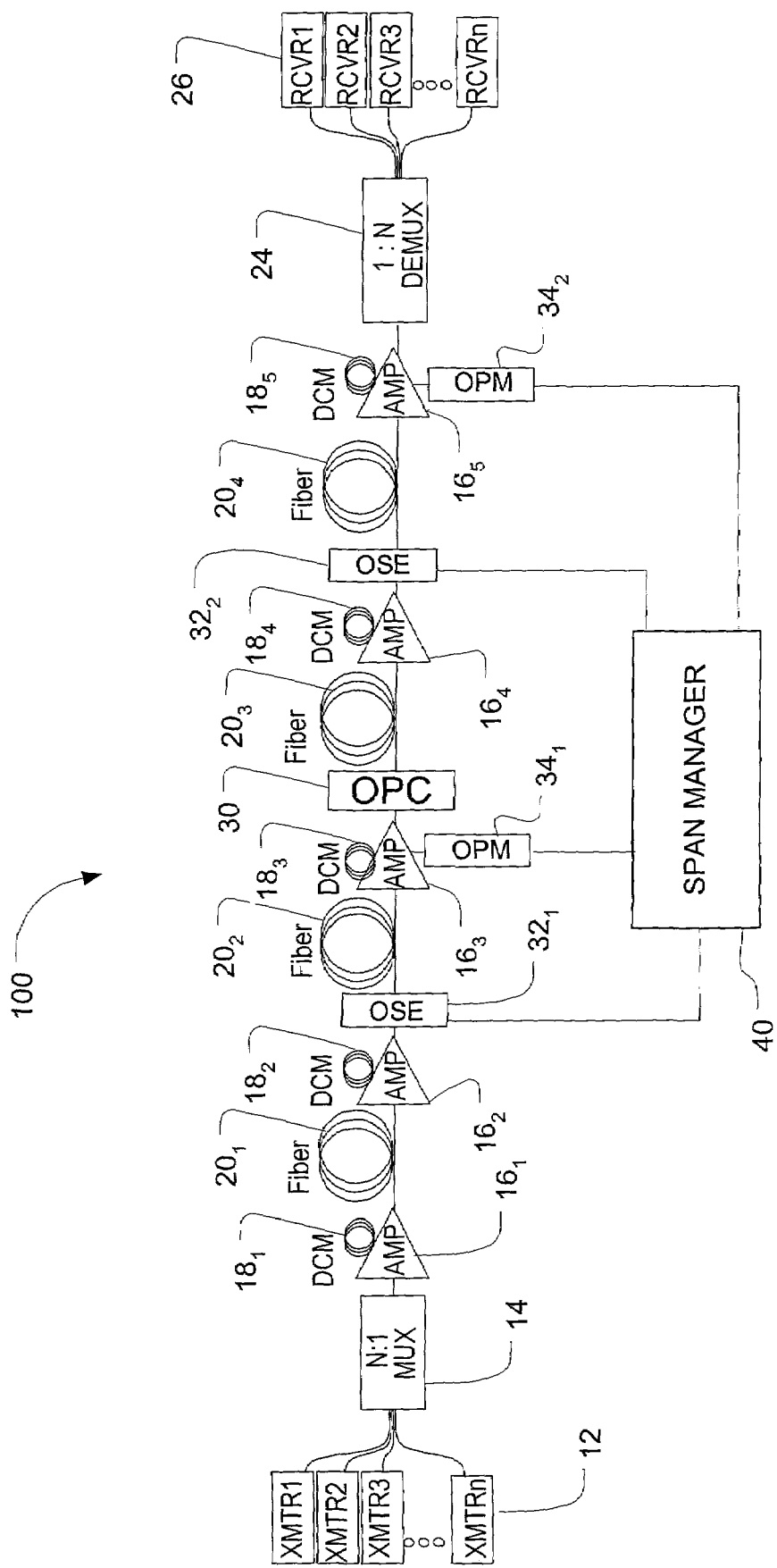
FIG. 3 is a block diagram of an exemplary optical communications network in an alternate embodiment of the invention; and, FIG. 4 is a block diagram of an exemplary optical communications network in another embodiment of the invention.

FIG. 3 depicts an optical communications network 100 in an alternate embodiment of the invention. Several non-linear effects are dependent on the power of the signal. A more accurate cancellation of non-linear effects, both due to Kerr non-linearity and due to Raman scattering, relies on a proper balance of accumulated dispersion and power in each of the optical carrier wavelengths. Power non-uniformity may be introduced by mechanisms such as wavelength-dependent fiber loss, optical amplifier gain ripple, and stimulated Raman inter-channel power transfer.

FIG. 3 shows an embodiment that includes optical power measurement (OPM) device 34 and optical power spectral equalizer (OSE) 32. The OPM device 34 monitors power across channels and the OSE 32 attenuates channel power(s) so that each channel has substantially equal power. The OPM device 34 is normally out of the optical signal path so it does not directly modify the signals. The OSE 32 is in the optical path to achieve desired signal manipulation. All non-linear effects (e.g., self-phase modulation, cross-phase modulation) are power dependent. By controlling power across channels, non-linear effects accumulate in a similar manner for each channel. This facilitates compensation of the non-linear effects since each channel can be compensated in a similar manner. By controlling power across channels, more accurate compensation is achieved.

As shown in FIG. 3, OPM device 34 and OSE 32 may be placed on both sides of the OPC 30. This allows the signal prior to the OPC 30 to have substantially the same power as the conjugate signal after the OPC 30. Accordingly, the power-dependent, non-linear effects accumulated prior to the OPC 30 are substantially cancelled by the transmission path after the OPC 30.

Control of the OSE's may be performed by a span manager 40 in communication with the OSE's 32 and OPM devices 34. The span manager 40 may communicate with the OSE's 32 and the OPM devices 34 using known techniques (e.g., over an in-band or out-of-band service channel, overlay IP network, etc.). The span manager 40 communicates with the OPM devices 34 and receives information about the state of the optical signals (e.g., power, wavelength, and OSNR) at that point in optical communications network 100. The span manager 40 then directs the OSE's 32 to change attenuation levels for different channels to provide substantially uniform power across channels. The span manager 40 may poll the OPM devices 34 additionally to ensure that the desired result is achieved. One OPM device 34 and one OSE 32 may be designated for controlling optical power in a sub-span. The power management performed by the span manager 40 may be local, on a sub-span basis or global across multiple sub-spans.

Figure 4:
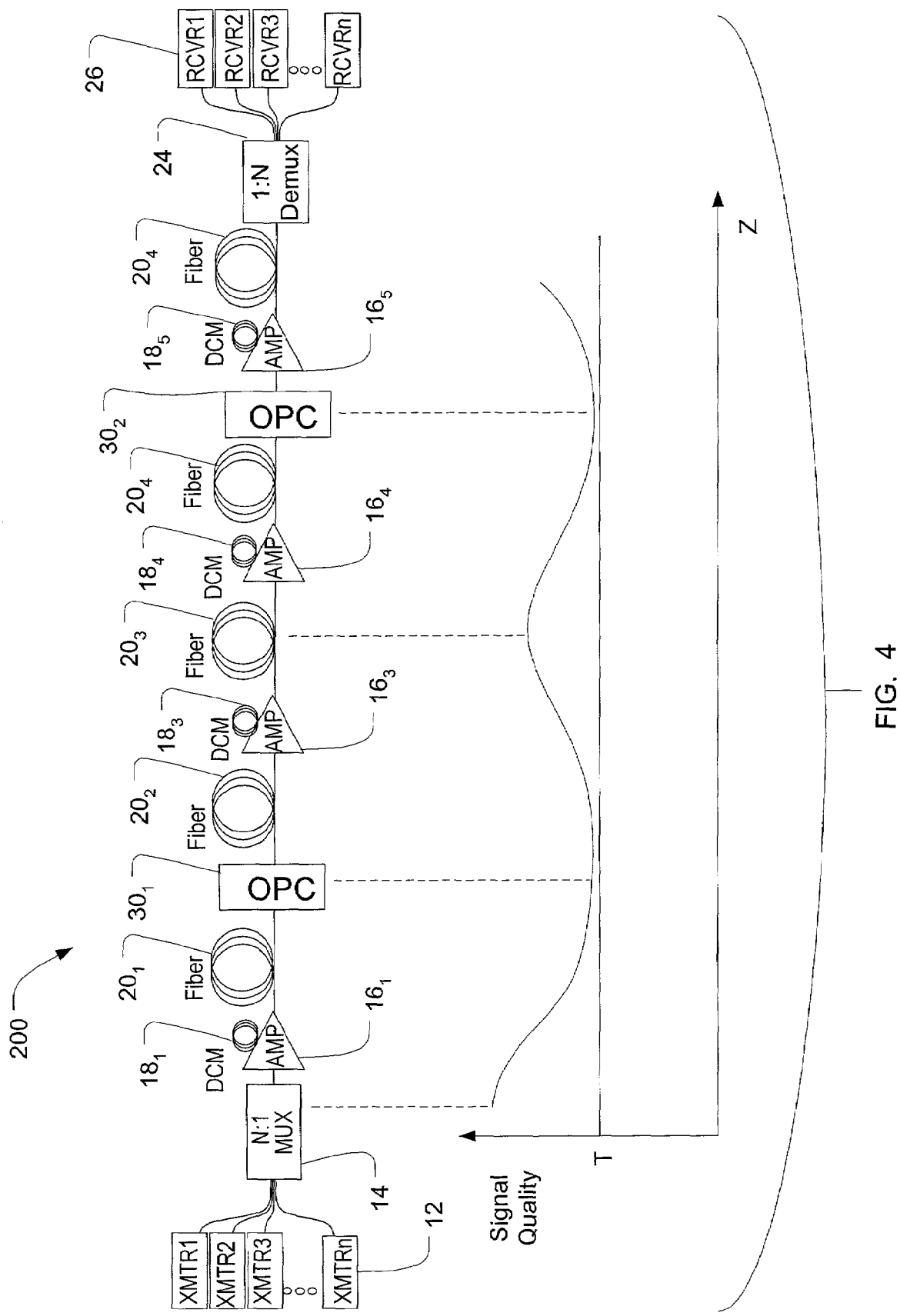

Multiple OPC's may be positioned along the transmission path between the transmitters 12 and receivers 26 to prevent excessive accumulation of nonlinear impairments, especially in cases where the fiber links are substantially different, or where wavelength channels may need to be dropped or added at intermediate points. FIG. 4 depicts an optical communications network 200 in another embodiment of the invention where the transmission path includes a plurality of OPC's $30_1$ and $30_2$.

Also shown in FIG. 4 is a plot of signal quality with respect to position along the transmission path. The signal quality may be represented by bit error rate, signal-noise ratio, etc. and is only exemplary to illustrate the effect of the OPC's. As shown in FIG. 4, the initial signal quality deteriorates due to due to noise accumulation and non-linear effects until the signal reaches first OPC $30_1$ at which point the conjugate signal is generated. After OPC $30_1$, the signal quality increases due to the non-linear effects being applied to the conjugate signal. After some point, the non-linear effects created prior to OPC $30_1$ are compensated and the non-linear effects begin to have deleterious effect on the signal until reaching OPC $30_2$. At OPC $30_2$, the signal is subjected to conjugation and thereafter the non-linear effects experienced prior to OPC $30_2$ are compensated. The signal is received a demultiplexer 24 for distribution to receivers 26. The OPC's may be located along the transmission path so that the signal quality is prevented from dropping below a limit, shown as T in FIG. 4.

In the above described embodiments, DCM's 18 are used to compensate linear effects such as dispersion and dispersion slope. The OPC's 30 are used to compensate non-linear effects such as self-phase modulation, cross-phase modulation, etc. Compensating linear effects and non-linear effects using separate devices provides a greater degree of control and allows compensation to be enhanced for each type of effect. In addition, OPM devices 32 and OSE's 34 may be used to control the power across channels providing yet another degree of control.

The additional degree of control afforded by embodiments of the invention can be used in several ways. For example, decoupling compensation of chromatic dispersion and non-linear effects reduces management software complexity, increases system robustness, and allows designers to improve overall system transmission capacity and distance.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A system for compensating dispersion and non-linear effects in an optical communications network having a plurality of transmitters, a multiplexer optically communicating with the transmitters and combining the signals into a multiplexed signal, a demultiplexer optically communicating with the multiplexer and a plurality of receivers optical communicating with said demultiplexer, the system comprising:

a dispersion compensation module optically communicating with said multiplexer, said dispersion compensation module compensating for dispersion of the multiplexed signal;

an optical phase conjugator optically communicating with said dispersion compensation module, said optical phase conjugator converting the multiplexed signal into a conjugate signal;

a second dispersion compensation module optically communicating with said optical phase conjugator, said second dispersion compensation module compensating for dispersion of the conjugate signal;

said optical phase conjugator being positioned such that non-linear effects on the multiplexed signal prior to said optical phase conjugator are compensated by non-linear effects on the conjugate signal after the optical phase conjugator, the compensation of the non-linear effects being decoupled from the compensation for dispersion of the multiplexed signal and the compensation for dispersion of the conjugate signal;

an optical power monitoring device monitoring power across a plurality of channels of the multiplexed signal;

an optical power spectral equalizer attenuating optical power of at least one channel to provide substantially uniform power across said plurality of channels of the multiplexed signal;

a second optical power monitoring device monitoring power across the plurality of channels of the conjugate signal; and, a second optical power spectral equalizer attenuating optical power of at least one channel to provide substantially uniform power across said plurality of channels of the conjugate signal.

2. The optical communications network of claim 1 wherein said dispersion compensation module compensates for dispersion slope.

3. The optical communications network of claim 1 wherein said dispersion compensation module is a separate component from said optical phase conjugator.

4. The optical communications network of claim 1 wherein said second dispersion compensation module compensates for dispersion slope.

5. The optical communications network of claim 1 wherein said second dispersion compensation module is a separate component from said optical phase conjugator.

6. The optical communications network of claim 1 further comprising:

a span manager in communication with said optical power monitoring device, said optical power spectral equalizer, said second optical power monitoring device and said second optical power spectral equalizer, said span manager controlling said optical power spectral equalizer and said second optical power spectral equalizer to provide substantially uniform power across a plurality of channels of the multiplexed signal and across a plurality of channels of the conjugate signal.

7. An optical communications network comprising:

a plurality of transmitters, each transmitter generating a transmit signal at a wavelength;

a multiplexer optically communicating with said transmitters, said multiplexer combining the transmit signals into a multiplexed signal;

an amplifier optically communicating with said multiplexer for amplifying the multiplexed signal;

a dispersion compensation module optically communicating with said amplifier, said dispersion compensation module compensating for dispersion of the multiplexed signal;

a fiber link optically communicating with said dispersion compensation module;

an optical phase conjugator optically communicating with said fiber link, said optical phase conjugator converting the multiplexed signal into a conjugate signal;

a second fiber link optically communicating with said optical phase conjugator;

a second amplifier optically communicating with said second fiber link for amplifying the conjugate signal;

a second dispersion compensation module optically communicating with said second amplifier, said second dispersion compensation module compensating for dispersion of the conjugate signal;

a demultiplexer optically communicating with said second dispersion compensation module, said demultiplexer converting the conjugate signal into multiple receive signals; and, a plurality of receivers optical communicating with said demultiplexer, each of said receivers receiving one of said receive signals;

said optical phase conjugator being positioned such that non-linear effects on the multiplexed signal prior to said optical phase conjugator are compensated by non-linear effects on the conjugate signal after the optical phase conjugator;

an optical power monitoring device monitoring power across a plurality of channels of the multiplexed signal;

an optical power spectral equalizer attenuating optical power of at least one channel to provide substantially uniform power across said plurality of channels of the multiplexed signal;

a second optical power monitoring device monitoring power across the plurality of channels of the conjugate signal; and, a second optical power spectral equalizer attenuating optical power of at least one channel to provide substantially uniform power across said plurality of channels of the conjugate signal.

8. The optical communications network of claim 7 wherein said amplifier is a discrete element.

9. The optical communications network of claim 7 wherein said amplifier provides distributed amplification.

10. The optical communications network of claim 7 wherein said second amplifier is a discrete element.

11. The optical communications network of claim 7 wherein said second amplifier provides distributed amplification.

12. A system for compensating chromatic dispersion and non-linear effects in an optical communications network having a plurality of fiber links interconnecting optical devices of the optical communications network carrying a WDM signal, the system comprising:

a dispersion compensation module connected to a first of the fiber links receiving the WDM signal, said dispersion compensation module substantially compensating for chromatic dispersion experienced by the WDM signal in the first fiber link;

an optical phase conjugator in optical communication with said dispersion compensation module, said optical phase conjugator converting the WDM signal into a conjugate WDM signal;

a second dispersion compensation module connected to a second of the fiber links receiving the conjugate WDM signal, said second dispersion compensation module substantially compensating for chromatic dispersion experienced by the conjugate WDM signal in the second fiber link;

said OPC being positioned in the optical communications network such that non-linear effects on the WDM signal prior to said OPC are substantially compensated by non-linear effects on the conjugate WDM signal after said OPC;

wherein compensation of chromatic dispersion is decoupled from compensation of non-linear effects;

an optical power monitoring device monitoring power across a plurality of channels of the WDM signal;

an optical power spectral equalizer attenuating optical power of at least one channel to provide substantially uniform power across said plurality of channels of the WDM signal;

a second optical power monitoring device monitoring power across the plurality of channels of the conjugate WDM signal; and, a second optical power spectral equalizer attenuating optical power of at least one channel to provide substantially uniform power across said plurality of channels of the conjugate WDM signal.

13. The system of claim 12 further comprising:
a third fiber link interconnecting said dispersion compensation module and said optical phase conjugator;
said second dispersion compensation module compensating for chromatic dispersion in the second fiber link and the third fiber link.

14. The system of claim 13 wherein:
said second dispersion compensation module compensates for chromatic dispersion introduced by said optical phase conjugator.

15. The system of claim 12 wherein:
said second dispersion compensation module compensates for chromatic dispersion introduced by said optical phase conjugator.

16. A method of compensating chromatic dispersion and non-linear effects in an optical communications network having a plurality of fiber links interconnecting optical devices of the optical communications network carrying a WDM signal, the method comprising:

at a first location, substantially compensating for chromatic dispersion experienced by the WDM signal;

at a second location, performing optical phase conjugation to convert the WDM signal into a conjugate WDM signal, the non-linear effects being substantially compensated as the conjugate WDM signal traverses the optical communications network; and at a third location, substantially compensating for chromatic dispersion experienced by the conjugate WDM signal;

wherein compensation of chromatic dispersion is decoupled from compensation of non-linear effects;

monitoring power across a plurality of channels of the WDM signal;

attenuating optical power of at least one channel to provide substantially uniform power across said plurality of channels of the WDM signal;

monitoring power across the plurality of channels of the conjugate WDM signal; and, attenuating optical power of at least one channel to provide substantially uniform power across said plurality of channels of the conjugate WDM signal.

17. The method of claim 16 wherein:
at the third location, said compensating for chromatic dispersion experienced by the conjugate WDM signal includes compensating for chromatic dispersion introduced by said performing optical phase conjugation.

18. A method of compensating chromatic dispersion and non-linear effects in an optical communications network having a plurality of fiber links interconnecting optical devices of the optical communications network carrying a WDM signal, the method comprising:

over a first group of fiber links, performing periodic amplification of the WDM signal;

over the first group of fiber links, performing periodic dispersion compensation of the WDM signal to substantially compensate for chromatic dispersion experienced by the WDM signal;

performing optical phase conjugation to convert the WDM signal into a conjugate WDM signal, over a second group of fiber links, performing periodic amplification of the conjugate WDM signal;

over the second group of fiber links, performing periodic dispersion compensation of the conjugate WDM signal to substantially compensate for chromatic dispersion experienced by the conjugate WDM signal;

wherein non-linear effects experienced by the WDM signal over the first group of fiber links is substantially compensated by non-linear effects experienced by the conjugate WDM signal over the second group of fiber links;

monitoring power across a plurality of channels of the WDM signal;

attenuating optical power of at least one channel to provide substantially uniform power across said plurality of channels of the WDM signal;

monitoring power across the plurality of channels of the conjugate WDM signal; and, attenuating optical power of at least one channel to provide substantially uniform power across said plurality of channels of the conjugate WDM signal.

* * * * *